United States Patent [19]

Hori et al.

[11] Patent Number: 4,689,626
[45] Date of Patent: Aug. 25, 1987

[54] DIGITAL CIRCUIT FOR CORRECTING PHASE SHIFT OF DIGITAL SIGNAL

[75] Inventors: Katsuya Hori; Masahiro Fujita, both of Kanagawa, Japan

[73] Assignee: Sony Corporation, Tokyo, Japan

[21] Appl. No.: 813,513

[22] Filed: Dec. 26, 1985

[30] Foreign Application Priority Data

Dec. 27, 1984 [JP] Japan ................... 59-281226

[51] Int. Cl.⁴ .................. H04B 7/185; G01S 5/02
[52] U.S. Cl. ........................... 342/357; 375/1
[58] Field of Search ............ 342/357, 356, 352, 387, 342/394, 458; 375/1; 324/83 D; 328/133

[56] References Cited

U.S. PATENT DOCUMENTS 4,485,383 11/1984 Maher .................. 342/352
4,617,674 10/1986 Mangulis et al. ........ 375/1

Primary Examiner—Theodore M. Blum
Attorney, Agent, or Firm—Lewis H. Eslinger; Alvin Sinderbrand

[57] ABSTRACT

A GPS receiver comprises a phase-error derivation circuit which derives the average phase error over a predetermined period. The phase-error derivation circuit sends an average phase difference signal to a numerically controlled oscillator to control its clock rate. Deriving the average phase error over the predetermined period makes it possible to determine accurately the phase error between the Gold code sequence from the satellite and the Gold code sequence derived by the local Gold code generator.

11 Claims, 2 Drawing Figures

DIGITAL CIRCUIT FOR CORRECTING PHASE SHIFT OF DIGITAL SIGNAL

BACKGROUND OF THE INVENTION

The present invention relates generally to a receiver adapted to receive a spread spectrum signal in Global Positioning System (GPS)/NAVSTAR, which receiver will be hereafter referred to as a "GPS receiver". More specifically, the invention relates to a circuit for correcting the phase shift of a locally derived Gold code relative to the phase of a Gold code sequence received from a satellite.

There is presently under development a position detection system, referred to as NAVSTAR Global Positioning System, wherein a constellation of eighteen orbiting satellites transmit pseudo-random ranging signals (hereafter referred to as "PRN signals") from which users with appropriate equipment can obtain three dimensional location, velocity and timing information anywhere on or near the surface of the Earth. The details of the NAVSTAR/GPS are given in "NAVIGATION", Journal of the Institute of Navigation, Volume 25, Number 2, December, 1978. In this system which will eventually be put into operation, the eighteen satellites will be deployed in circular 10,900-nautical-mile orbits in three mutually-inclined planes. A minimum of four satellites will be in twelve-hour orbits and the position of each satellite at any time will be precisely known. The longitude, latitude and altitude of any point close to Earth, with respect of the center of the Earth can be calculated from the propagation times of electromagnetic signals from four of the satellites to that point.

A signal about a single center frequency from each visible satellite will be received by a user terminal at a point close to Earth to measure propagation times of the electromagnetic signals transmitted by the satellites. The satellites from which the signals originate are identified by modulating the signal transmitted from each satellite with pseudo-random coded signals. The GPS system will operate in two modes simultaneously. In one mode, referred to as the clear/acquisition (C/A) mode, the PRN signal is a Gold code sequence that is repeated once every millisecond to enable the position of the receiver responsive to the signal transmitted from four of the satellites to be determined to an accuracy of 100 meters. In a second mode, referred to as the precise or protected (P) mode, pseudo-random codes are transmitted with sequences that are 7-days long, enabling the user terminal position to be determined to an accuracy of better than 10 meters.

It should be noted that, throughout the following disclosure, the word "Gold code" generally means the PRN signal used in C/A mode but may also refers the pseudo-random code used in P mode.

When computing the user terminal position, the receiver will operate in three modes, viz, signal acquisition, signal tracking and position fixing. In the acquisition mode, the receiver must know, approximately, its location and have available a recent version of the GPS almanac. For acquisition, Doppler estimates must then be computed for the subset of GPS satellites with the best geometry, i.e., the four satellites with the greatest elevation, typically above 20° as observed by the given terminal. This leaves the GPS demodulator with a GPS carrier frequency uncertainty of several hundred hertz. For the receiver to generate locally a carrier reference to this accuracy, however, requires an oven-stabilized L-Band synthesizer. To enable the receiver to separate the C/A signals received from the different satellites, the receiver also contains a number of different Gold code reference sources corresponding to the number of satellites in the constellation. The locally derived code and carrier references are cross-correlated with received GPS signals over one or more Gold code sequence intervals. The receiver shifts the phase of the locally derived Gold code sequence on a chip-by-chip basis and within each chip in 0.5–1.0 microsecond steps, spanning one millisecond code periods for the C/A code until the maximum cross-correlation is obtained. The chipping rate of a pseudo-random sequence is the rate at which the individual pulses in the sequence are derived and therefore is equal to the code repetition rate divided by the number of chips in the code. Each pulse in the code is referred to as a chip.

In the tracking mode, code delay is tracked continuously and an aligned or "punctual" code stream generated. This is implemented with either a delay lock loop or by means of the tau-dither technique. In either case, the result is a continuously tracked code generator with delay error on the order of 0.1 microsecond. Secondly, initial Doppler uncertainty must be further reduced. This is done by stepping the frequency synthesizer and measuring the correlator output. Once the Doppler uncertainty is reduced to 10–20 Hz, the carrier phase and the raw GPS data messages are recovered using a Costas loop and the aforementioned punctual code.

After four locally derived Gold code sequences are locked in phase with the Gold code sequences received from the satellites in the field of view of the receiver, the position, velocity and time associated with the receiver as well as other variables of interest can, upon further local processing of the GPS data messages, be determined. Position accuracy may be obtained to about 100 meters. This data processing requires storage in the terminal of ephemeris parameters, updated hourly, together with a software model for the GPS satellite orbits, to allow computation in real time of satellite coordinates for correspondence with time of arrival of GPS satellite-generated pseudo-range data.

In such GPS receivers, the Gold code sequences transmitted by the different satellites are arranged so that a maximum cross-correlation product between any two of them is about 65, whereas the autocorrelation product of an internal Gold code generator which produces the local Gold code sequence and the Gold code sequence transmitted from one of the satellite is 1023. The correlation value is defined, for this purpose, as the number of identical bits in a 1023-bit epoch of a Gold code sequence. When the phase of a local Gold code generator is adjusted so that the maximum cross-correlation value is derived, the locally derived Gold code sequence has the same phase as the Gold code sequence that is coupled to receiver, whereby the time of the local code can be used to help derive the position of the receiver.

The GPS receivers use conventional delay-locked loops to adjust the phase of the local Gold code generator. A delay-locked loop comprises a correlation circuit, a phase error derivation circuit, a voltage-controlled oscillator and the local Gold code generator. The correlation circuit produces a correlation output when the local Gold code sequence from the local Gold code generator correlates well with the Gold code sequence from the satellite. The phase error derivation circuit responds to this correlation output by outputting a phase error signal. The voltage-controlled oscillator is controlled by a clock signal with a variable oscillation frequency related to the phase error signal. This holds the two Gold codes in phase.

In such conventional GPS receivers, since the controlling oscillator in a loop which controls the local Gold code generator based on the phase error between the Gold code sequence received from the satellite and the local Gold code derived by the local Gold code generator, which loop will be referred to as the "PN-locking loop", is made up of analog circuitry, such as a voltage-controlled oscillator, it prevents full integration of the circuitry of the GPS receiver. Therefore, it is desired to implement the PN-locking loop solely in digital circuitry. In such digital circuitry, numerically controlled oscillator (NCO) may be employed. However, if an NCO were employed in the PN-locking loop, delicate control of the local Gold code generator would be impossible. For instance, assuming the oscillation frequency of the NCO is $f_s$, phase control at a precision finer than $1/f_s$ would be impossible.

Consequently, although it is known that digital circuitry has greater voltage stability and higher reliability, it has been considered impossible to employ digital circuitry in the PN-locking loop due to the lower accuracy of synchronization and propagation time measurement than with conventional analog circuitry.

SUMMARY OF THE INVENTION

Therefore, it is an object of the present invention to provide a GPS receiver which has a digital phase- or PN-locked loop with sufficiently high-accuracy synchronization and propagation time measurement.

Another and more specific object of the present invention is to provide a GPS receiver employing NCO's in the PN-locking loop for controlling the phase of a local Gold code generator precisely.

In order to accomplish the above-mentioned and other objects, a GPS receiver, in accordance with the present invention, comprises a phase-error derivation circuit which derives the average phase error over a predetermined period. The phase-error derivation circuit sends an average phase difference signal to a numerically controlled oscillator to control its clock rate.

Deriving the average phase error over the predetermined period makes it possible to derive the phase error between the Gold code sequence from the satellite and the Gold code sequence derived by the local Gold code generator precisely.

Therefore, the present invention makes application of digital circuitry to the delay locked loop in the GPS receiver possible.

According to one aspect of the invention, a receiver system for deriving the position of a receiver station from spread spectrum signals broadcast by satellites, comprises means for receiving the spread spectrum signals from the satellite, the spread spectrum signals and a repeating pulse epoch having the same frequency with the spread spectrum signal, means, installed in the receiver system, for generating a signal essentially matching the spread spectrum signal from the satellite and containing pulse epochs at intervals essentially matching those of the signal from the satellite, means for comparing the spread spectrum signals from the satellite with the internally generated signal and producing a correlation signal when correlation therebetween is established, means, responsive to the correlation signal from the correlating means, for deriving the average phase error between the spread spectrum signals from the satellite and the internally generated signals over predetermined periods of times, and producing an average phase-error signal, means, responsive to the average phase error signal, for controlling the internal spread spectrum signal generating means to adjust the phase of the internally generated spread spectrum signal so as to reduce the phase error, and means for deriving a basic propagation time value of the spread spectrum signal from the satellite relative to the internally generated spread spectrum signal and thereby deriving the distance of the satellite from the receiver station and for correcting the basic propagation time value based on the average phase error signal value to derive a correct propagation time.

The means for controlling the internal spread spectrum signal generating means comprises a digital circuit. Also, the means for deriving the average phase-error comprises a digital circuit.

In the preferred embodiment the means for controlling the internal spread spectrum signal generating means comprises a numerically controlled oscillator.

The predetermined periods of time match the epoch intervals of the spread spectrum signals.

The receiver system further comprises a clock generator and the means for controlling the internal spread spectrum signal generating means controls the pulse frequency of a clock signal generated by the clock generator for controlling the phase of the internally generated spread spectrum signal.

According to another aspect of the invention, a process for deriving the position of a receiver station from a spread spectrum signal transmitted by a satellite, comprises the steps of:

receiving the spread spectrum signals from the satellite, the spread spectrum signals containing a repeating pulse epoch at given intervals;

generating a signal essentially matching the spread spectrum signal from the satellite and containing pulse epochs at intervals essentially matching those of the signal from the satellite;

comparing the spread spectrum signals from the satellite with the internally generated signal and producing a correlation signal when correlation therebetween is established;

deriving the average phase error between the spread spectrum signals from the satellite and the internally generated signals over predetermined periods of time in response to the correlation signal, and producing an average phase-error signal;

adjusting the phase of the internally generated spread spectrum signal so as to reduce the phase error on the basis of the phase-error signal; and deriving a basic propagation time value of the spread spectrum signal from the satellite relative to the internally generated spread spectrum signal and thereby deriving the distance of the satellite from the receiver station and correcting the basic propagation time value based on the average phase error signal value to derive a correct propagation time.

In the preferred embodiment, the step of controlling the phase of the internal spread spectrum signal is performed by means of a digital circuit, and the step of deriving the average phase-error is performed by a digital circuit.

Preferably, the step of controlling the phase of the internal spread spectrum signal is performed by a numerically controlled oscillator.

The predetermined periods of time match the epoch intervals of the spread spectrum signals.

BRIEF DESCRIPTION OF THE DRAWINGS

The present invention will be understood more fully from the detailed description given herebelow and from the accompanying drawings of the preferred embodiment of the present invention, which, however, should not be taken to limit the invention to the specific embodiment but are for explanation and understanding only.

In the drawings.

DESCRIPTION OF THE PREFERRED EMBODIMENT

Figure 1:
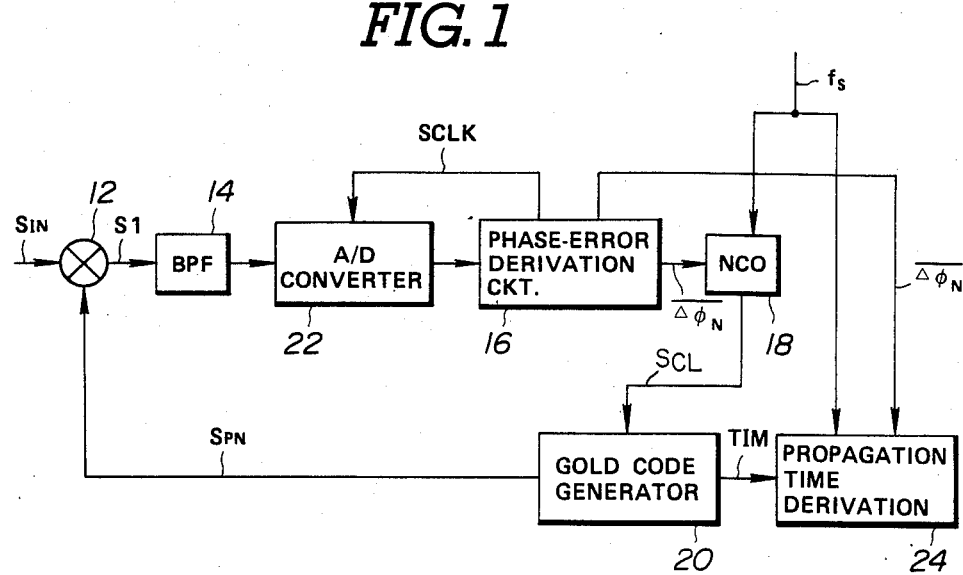
FIG. 1 is a block diagram of the preferred embodiment of a PN-locking loop in a GPS receiver according to the present invention.

Referring now to the drawings, particularly to FIG. 1, a GPS receiver 10 has a looped circuit including a correlation circuit 12, a band-pass filter 14, a phase-error derivation circuit 16, a numerically controlled oscillator 18 and an internal or local Gold code generator 20. The local Gold code generator 20 generates a local Gold code sequence $S_{PN}$ made up of repeating epochs at known intervals, which local Gold code sequence will be hereafter referred to as the "local code". The local Gold code sequence matches a Gold code sequence $S_{IN}$ received from a satellite, which will be hereafter referred to as the "satellite code". The correlation circuit 12 comprises a multiplier which receives both the satellite code $S_{IN}$ and the local code $S_{PN}$ for correlation thereof. The correlation circuit 12 produces a correlation output $S_1$ when correlation between the satellite code and the local code is established.

The phase-error derivation circuit 16 responds to the correlation output $S_1$ from the correlation circuit 12 by deriving the magnitude $\Delta\phi$ of phase error between the satellite code $S_{IN}$ and the local code $S_{PN}$. The phase-error derivation circuit 16 outputs a phase-error signal $S_{\Delta\phi}$ to the numerically controlled oscillator 18. The oscillation frequency $f_s$ of a clock signal supplied to the numerically controlled oscillator 18 and the phase-error signal from the phase-error derivation circuit 16 control the numerically controlled oscillator 18 so that it generates a clock $S_{CL}$ that controls the phase of the local Gold code generator 20. This holds the satellite code $S_{IN}$ and the local code $S_{PN}$ in phase.

Under phase-locked conditions, the epoch of the satellite code, which repeats at regular intervals, is sent to a propagation time measuring circuit 24. The propagation time measuring circuit 24 derives a propagation time value based on the delay of the epoch of the satellite code relative to the epoch of the local code.

According to the preferred embodiment of the GPS receiver according to the present invention, the phase-error derivation circuit 16 is digital. Therefore, in order to make the correlation output $S_1$ of the correlation circuit 12 transmitted through the band-pass filter 14 applicable to the digital phase-error derivation circuit 16, an analog-to-digital (A/D) converter 22 is installed between the band-pass filter 14 and the phase-error derivation circuit 16.

The phase-error derivation circuit 16 derives a value indicative of the phase error $\Delta\phi$ between the satellite code $S_{IN}$ and the local code $S_{PN}$. The phase-error derivation circuit 16 integrates the phase-error indicative values over one epoch cycle $TE2_N$ of the satellite code to derive an average phase error value $\overline{\Delta\phi_N}$ and produce a corresponding average phase-error signal $S_{\Delta\phi}$. The phase-error derivation circuit 16 sends the average phase-error signal $S_{\Delta\phi}$ to the numerically controlled oscillator 18. Derivation circuit 16 has an internal clock generator which outputs a sampling clock SCLK to the A/D converter 22. The frequency of the sampling clock SCLK is selected to be sufficiently high to enable the A/D converter 22 to convert the correlation output $S_1$ of the correlation circuit 12 into a digital signal.

The numerically controlled oscillator 18 receives a clock $f_s$ which has a frequency of 40 nsec, for example. The numerically controlled oscillator 18 derives a pulse rate based on the average phase-error signal $S_{\Delta\phi}$ and produces a clock $S_{CL}$ with the derived pulse rate. The phase of the local code $S_{PN}$ produced by generator 20 is controlled by the clock $S_{CL}$ from the numerically controlled oscillator 18. The local Gold code generator 20 produces each epoch $EP_i (EP_{N-1}, EP_N ...)$ of the local code. Upon generating each epoch, the local Gold code generator 20 outputs a timing signal TIM to the propagation measuring circuit 24.

The propagation time measuring circuit 24 also receives the clock $f_s$, the phase-error signal $S_{\Delta\phi}$ and the timing signal TIM and derives the propagation time at every occurrence of the epoch, i.e. every 1 msec.

Figure 2:
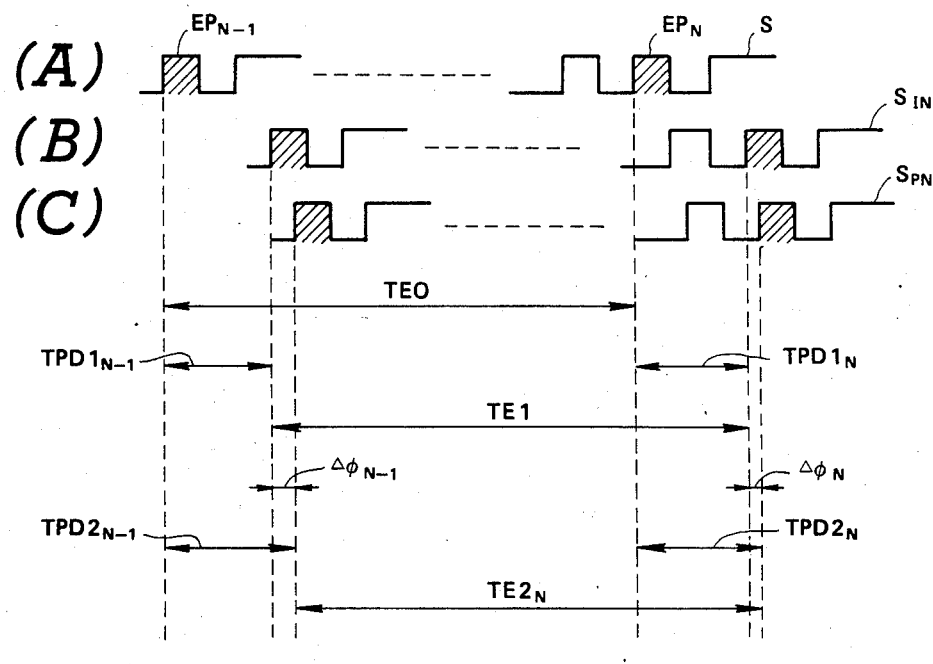
FIG. 2 is an explanatory chart showing the relationship between the Gold code sequence from a satellite and a local Gold code derived by a local Gold code generator in the PN-locking loop of FIG. 1.

The propagation time derivation process performed by the propagation time measuring circuit 24 will be described herebelow with reference to FIG. 2. In FIG. 2, FIG. 2(A) shows the transmission timing of the Gold code S in the satellite. The Gold code S is made up of epochs $EP_{N-1}, EP_N ...$ repeating at known intervals, e.g. 1 msec. The satellite code $S_{IN}$ (FIG. 2(B)) is received by the GPS receiver 10 after a propagation time $TPD1_{N-1}, TPD1_N ...$.

The GPS receiver controls the phase of the local Gold code generator 20 so that the phase of the local code $S_{PN}$ (FIG. 2(C)) approaches the phase of the satellite code $S_{PN}$ to the extent possible. However, due to the limit of phase-error adjustment in the numerically controlled oscillator 18, the phase of the local code $S_{PN}$ cannot be adjusted relative to the satellite code $S_{IN}$ beyond the resolution of the clock frequency $f_s$. Therefore, the local code $S_{PN}$ is still subject to a slight phase error $\Delta\phi_{N-1}, \Delta\phi_N$ relative to the satellite code.

The difference between phase errors $\Delta\phi_{N-1}, \Delta\phi_N$ at the measuring points $N-1$ and $N$ at which epochs in the sattelite code start can be expressed by the following equation:

$$\Delta\phi_{N-1} - \Delta\phi_N = TE_1 - TE_2 \quad (1)$$

where $TE_1$ is the interval between the epochs $EP_{N-1}$ and $EP_N$ of the satellite code $S_{IN}$; and $TE_2$ is the interval between the epochs $EP_{N-1}$ and $EP_N$ of the local code $S_{PN}$.

Assume that the phase errors vary linearly. Since the interval $TE_0$ between the epochs $EP_{N-1}$ and $EP_N$ of the Gold code S generated by the satellite is 1 msec., the average phase-error $\overline{\Delta\phi_N}$ can be expressed as:

$$\overline{\Delta\phi_N} = (\Delta\phi_{N-1} + \Delta\phi_N)/2 \quad (2)$$

From the foregoing equations (1) and (2), the phase-error $\Delta\phi_N$ can be calculated by:

$$\Delta\phi_N = \overline{\Delta\phi_N} + (TE_{2N} - TE_1)/2 \quad (3)$$

Therefore, by subtracting the phase error $\Delta\phi_N$ derived from the equation (3) from the propagation time $TPD_{2N}$ which is measured by counting clock pulses $f_s$, the actual propagation time $TPD_1$ can be obtained from the following equation:

$$TPD_{1N} = TPD_{2N} - \Delta\phi_N = TPD_{2N} - \overline{\Delta\phi_N} - (TE_{2N} - TE_1)/2 \quad (4)$$

Accordingly, the propagation time deriving circuit 24 solves formula (4) in order to derive the actual propagation time $TPD_{1N}$. The propagation time deriving circuit 24 counts the clock pulse $f_s$ from the known timing at which the epoch $EP_N$ is transmitted from the satellite until the timing signal TIM from the local Gold code generator 20, in order to measure the propagation time $TPD_{2N}$. At the same time, the propagation time deriving circuit 24 counts the clock pulse $f_s$ in response to the timing signal TIM to derive the epoch cycle $TE_{2N}$.

Since the numerically controlled oscillator 18 controls the phase of the Gold code $S_{PN}$ in response to the clock $f_s$, the timing signal TIM can be produced in synchronism with timing of the clock $f_s$. Therefore, there cannot be an error between the propagation time $TPD_{2N}$ and the epoch cycle $TE_{2N}$.

The propagation time deriving circuit 24 also receives the average phase-error signal $S_{\Delta\phi}$ from the phase-error derivation circuit 16, as set forth above. In the shown embodiment, since the epoch cycle of the satellite code $S_{IN}$ will never fluctuate significantly, the epoch cycle $TE_1$ may be regarded as being constant.

As will be appreciated herefrom, according to the shown embodiment, an accurate propagation time value $TPD_{1N}$ can be obtained by solving formula (4).

On the other hand, the numerically controlled oscillator 18 is responsive to the average phase-error signal $S_{\Delta\phi}$ from the phase-error derivation circuit 16 to adjust its pulse frequency so that the local code $S_{PN}$ and the satellite code $S_{IN}$ can be held in phase.

The preferred embodiment of the GPS receiver makes the accuracy of the derived propagation time value $TPD_{1N}$ substantially higher than $\pm 1/f_s$, since the propagation time $TPD_{2N}$ and the epoch cycle $TE_{2N}$ can be measured by counting the clock pulse $f_s$ without error. In addition, since the epoch cycle $TE_1$ of the satellite code $S_I$ has substantially no quantization error, the constant value can be used in the foregoing calculations of the actual propagation time without causing any problems. Furthermore, correction of the propagation time by reference to the average phase error between the satellite code and the local code allows digital circuits to be used in the GPS receiver without degrading accuracy of measurement.

The use of digital IC circuits for deriving phase-error and controlling the local Gold code generator lowers the production costs significantly.

It should be noted that, although the shown embodiment has assumed the epoch cycle of the satellite code to be constant, it would be possible to correct the epoch cycle $TE_1$ of the satellite code $S_{IN}$ by detecting the chip frequency of the satellite code and deriving a correction value based on the chip frequency detected by the phase-error derivation circuit. After correcting for the epoch cycle of the satellite code, the influence of Dopper shift is fully eliminated.

Therefore, the present invention fulfills all of the objects and advantages sought therefor.

What is claimed is:

1. A receiver system for deriving the position of a receiver station from spread spectrum signals broadcast by a plurality of satellites, comprising:

means for receiving said spread spectrum signals from respective ones of said satellites, said spread spectrum signals containing a repeating pulse epoch at given intervals;

generating means installed in said receiver system for internally generating respective signals substantially matching said spread spectrum signals from said satellites and containing pulse epochs at intervals substantially matching those of said signals from said satellites;

correlating means for comparing said spread spectrum signals from said satellites with said internally generated signals and producing a correlation signal when correlation therebetween is established;

means responsive to said correlation signal from said correlating means for deriving the average phase error between said spread spectrum signals from said satellites and said internally generated signals over predetermined periods of time and producing an average phase-error signal;

means responsive to said average phase-error signal for controlling said generating means to adjust the phase of said internally generated signals so as to reduce said phase error; and means for deriving a basic propagation time value of said spread spectrum signals from said satellites relative to said internally generated signals and for correcting said basic propagation time value based on said average phase-error signal to derive a correct propagation time and thereby derive the distance of said receiver station from said respective satellites.

2. The receiver system as set forth in claim 1, wherein said means for controlling said generating means comprises a digital circuit.

3. The receiver syetem as set forth in claim 2, wherein said means for deriving said average phase error comprises a digital circuit.

4. The receiver system as set forth in claim 3, wherein said means for controlling said generating means comprises a numerically controlled oscillator.

5. The receiver system as set forth in claim 4, wherein said predetermined periods of time match the epoch intervals of said spread spectrum signals.

6. The receiver system as set forth in claim 5, which further comprises a clock generator that generates clock signal pulses at a given pulse frequency and said means for controlling said generating means controls said pulse frequency, thereby controlling the phase of said internally generated spread spectrum signal.

7. A process for deriving the position of a receiver station from spread spectrum signals transmitted by a plurality of satellites, comprising the steps of:

receiving said spread spectrum signals from said satellites, said spread spectrum signals containing a repeating pulse epoch at given intervals;

internally generating at said receiver station respective signals substantially matching said spread spectrum signals from said satellites and containing pulse epochs at intervals substantially matching those of said signals from said satellites;

comparing said spread spectrum signals from said satellites with said internally generated signals and producing a correlation signal when correlation therebetween is established;

deriving the average phase error between said spread spectrum signals from said satellites and said internally generated signals over predetermined periods of time in response to said correlation signal and producing an average phase-error signal;

adjusting the phase of said internally generated signals so as to reduce said phase error on the basis of said phase-error signal; and deriving a basic propagation time value of said spread spectrum signals from said satellites relative to said internally generated signals and correcting said basic propagation time value based on said average phase-error signal value to derive a correct propagation time and thereby derive the distance of said receiver station from said respective satellites.

8. The process as set forth in claim 7, wherein said step of adjusting the phase of said internally generated signals is performed by means of a digital circuit.

9. The process as set forth in claim 8, wherein said step of deriving said average phase/error is performed by a digital circuit.

10. The process as set forth in claim 9, wherein said step of adjusting the phase of said internally generated signals is performed by a numerically controlled oscillator.

11. The process as set forth in claim 10, wherein said predetermined periods of time match the epoch intervals of said spread spectrum signals.

* * * * *